(12) United States Patent
Mueller et al.

(10) Patent No.: US 12,106,953 B2
(45) Date of Patent: Oct. 1, 2024

(54) WIDE RANGE ELECTRON IMPACT ION SOURCE FOR A MASS SPECTROMETER

(71) Applicant: INFICON, Inc., East Syracuse, NY (US)

(72) Inventors: Norbert Mueller, Gams (CH); Daniel Vanoni, East Syracuse, NY (US); Jochen Wagner, Chur (CH)

(73) Assignee: Inficon, Inc., East Syracuse, NY (US)

( * ) Notice: Subject to any disclaimer, the term of this patent is extended or adjusted under 35 U.S.C. 154(b) by 0 days.

(21) Appl. No.: 18/274,597

(22) PCT Filed: Mar. 15, 2022

(86) PCT No.: PCT/US2022/020293
§ 371 (c)(1),
(2) Date: Jul. 27, 2023

(87) PCT Pub. No.: WO2022/203898
PCT Pub. Date: Sep. 29, 2022

(65) Prior Publication Data
US 2024/0038522 A1 Feb. 1, 2024

Related U.S. Application Data

(60) Provisional application No. 63/165,412, filed on Mar. 24, 2021.

(51) Int. Cl.
*H01J 49/14* (2006.01)
*G01N 27/64* (2006.01)
(Continued)

(52) U.S. Cl.
CPC ............ *H01J 49/147* (2013.01); *G01N 27/64* (2013.01); *G01N 30/7206* (2013.01); *H01J 49/0031* (2013.01); *H01J 49/145* (2013.01)

(58) Field of Classification Search
CPC .... H01J 49/147; H01J 49/0031; H01J 49/145; H01J 49/26; G01N 27/64; G01N 27/626;
(Continued)

(56) References Cited

U.S. PATENT DOCUMENTS

| | | | | | |
|---|---|---|---|---|---|
| 4,742,232 | A | * | 5/1988 | Biddle | H01J 27/022 |
| | | | | | 315/111.41 |
| 4,845,364 | A | * | 7/1989 | Alexander | H01J 49/142 |
| | | | | | 250/288 |

(Continued)

FOREIGN PATENT DOCUMENTS

| WO | 2019/217541 A1 | 11/2019 |
|---|---|---|
| WO | 2020/244889 A1 | 12/2020 |

OTHER PUBLICATIONS

Sakamoto, Usefulness of Smart EI/CI Ion Source Which Enables Both EI and CI Mode Measurements with the Same Ion Source, Shimadzu Excellence in Science, On or before Sep. 30, 2018, Shimaszu Corporation (8 pages).

(Continued)

*Primary Examiner* — Kiet T Nguyen
(74) *Attorney, Agent, or Firm* — Barclay Damon LLP

(57) ABSTRACT

A wide-range ion source for a mass spectrometer comprises a first portion and a second portion that is positioned downstream of the first portion. The first portion includes an anode and a first filament that is positioned proximate the anode and secured in place relative to the anode. The first filament is exposed to a pressure of a process chamber. A first electron repeller has at least a partially circular shape. The second portion includes a tubular anode, a second filament surrounding the tubular anode, an extraction lens defining an opening and a focus lens to conduct ions into a volume.

16 Claims, 11 Drawing Sheets

(51) Int. Cl.
*G01N 30/72* (2006.01)
*H01J 49/00* (2006.01)

(58) Field of Classification Search
CPC ... G01N 27/623; G01N 30/7206; G01N 30/72
USPC .......................................................... 250/288
See application file for complete search history.

(56) References Cited

U.S. PATENT DOCUMENTS

| | | | |
|---|---|---|---|
| 2006/0226355 A1* | 10/2006 | Watanabe | H01J 49/4215 250/294 |
| 2010/0084549 A1 | 4/2010 | Ermakov et al. | |
| 2010/0133429 A1 | 6/2010 | Nakajima et al. | |
| 2016/0172146 A1 | 6/2016 | Wang | |
| 2016/0225600 A1 | 8/2016 | Park et al. | |

OTHER PUBLICATIONS

Ahlstrom et al., Mass Spectrometers, On or before Dec. 31, 2003, Béla Lipták (8 pages).

Meyer et al., Mass Spectrometry of Planetary Exospheres at High Relative Velocity: Direct Comparison of Open- and Closed-Source Measurements, Geoscientific Instrumentation Method and Data Systems, 6, 1-8, 2017, doi: 10.5194/gi-6-12017, Aug. 4, 2016 (8 pages).

Kasprzak et al., Cassini Orbiter Ion and Neutral Mass Spectrometer Instrument, SPIE vol. 2803 / 129; 0-8194-2191-X/96, Oct. 7, 1996 (12 pages).

Waite, et al., The Cassini Ion and Neutral Mass Spectrometer (INMS) Investigation, Kluwer Academic Publishers, Space Science Reviews 114: 113-231, Feb. 17, 2004 (119 pages).

PCT/US2022/020293, filed Mar. 15, 2022; International Search Report and Written Opinion, Date of Mailing Jun. 29, 2022 (9 pages).

U.S. Patent and Trademark Office as ISA/US, International Search Report and Written Opinion of the ISA from International Patent Appl. No. PCT/US2022/020293, mailed Jun. 29, 2022 (total 8 pgs.).

U.S. Patent and Trademark Office as ISA/US, International Preliminary Report on Patentability (IPRP) and Written Opinion of the ISA from International Patent Appl. No. PCT/US2022/020293, issued Sep. 12, 2023 (total 7 pgs.).

\* cited by examiner

WIDE RANGE ELECTRON IMPACT ION SOURCE FOR A MASS SPECTROMETER

CROSS-REFERENCE TO RELATED APPLICATIONS/PRIORITY CLAIM

This application is a national stage application pursuant to 35 U.S.C. § 371 of International Application No. PCT/US2022/020293, filed on Mar. 15, 2022, which is related to, and claims priority to, commonly-owned U.S. Provisional Patent Application Ser. No. 63/165,412 filed Mar. 24, 2021, having the same title. The entire contents of said applications are incorporated by reference.

TECHNOLOGICAL FIELD

This disclosure is generally related to an ion source for a mass spectrometer and specifically, a wide range electron impact ion source capable of operating in high and low pressures.

BACKGROUND

Electron impact ion sources are the standard for Residual Gas Analyzers. While there are many different configurations of electron impact ion sources available, they are often grouped into two categories: (1) open ion sources (OIS); and (2) closed ion sources (CIS).

Open ion sources are directly exposed to the vacuum environment and have conductance (an as high a conductance as possible) to enable gases to reach the ionization region easily. Open ion sources create ions in a large volume and therefore, show a high sensitivity. The direct exposure of the open ion source to the vacuum environment limits the maximum pressure of open ion sources to about 1E-3 mbar due to filament life time and mean free path length considerations. Open ion sources ionize all the gases in the vacuum environment, such as process gases, desorbed gases from the chamber walls, and gases released by the mass spectrometer itself. At low pressures the process gases may overlap with residual gas components and so will be difficult to quantify. The same is true for components with low abundance in the process gas which are present in the residual gas as well.

Closed ion sources, on the other hand, are used when the pressure of the process gas is higher than the maximum allowed pressure of the mass spectrometer and/or when the gas components to be analyzed overlap with residual gas components. Systems with closed ion sources require a separate pumping system to create a pressure differential between the sensitive volume of the ion source and the remainder of the mass spectrometers vacuum chamber. Closed ion sources have a vacuum conductance of 1 l/s, or in extreme cases 0.1 l/s. As filaments and the analyzer region are kept at low pressure by differential pumping, the ionization region of the ion source may be operated at pressures above 1E-3 mbar. This allows for a direct connection of such ion sources to e.g. sputter processes in semiconductor tools. However, the downside of closed ion sources is that they have low sensitivity or poor minimal detectable partial pressure (MDPP) as compared to an open ion source. In order to obtain a low conductance, the electron entrance openings must be kept small so that only a portion of the electrons created by the filament can enter the ionization volume. Closed ion sources also have a smaller ionization volume compared to that of an open ion source.

A solution to the aforementioned problems has been to install two (2) complete mass spectrometer systems on a single vacuum system with widely varying pressure. However, switching between the two (2) filaments of the spectrometers requires deactivation of the first filament and activation of the second filament. This leads to dead time between the deactivation of the first filament and the activation of the second filament. Alternatively, a mass spectrometer system with adaptable pressure reduction using valves may be installed into a single vacuum system. However, these valves are problematic at base pressure due to the limited vacuum conductance of the valve.

These are just some of the problems associated with the open ion sources and the closed ion sources currently used for mass spectrometry.

BRIEF SUMMARY

The ion sources currently used operate in either high pressure ranges or low pressure ranges. In contrast, the disclosed ion source is capable of working in both a low pressures as well as in high pressure ranges. The higher sensitivity in the low pressure ranges results in improved detection limit for low pressure process steps.

An embodiment of the wide range electron impact ion source (wide range ion source) comprises one or more filaments positioned in the process volume or process chamber with a high yield of electrons reaching the ionization volume. One or more additional filaments are positioned in the differentially pumped volume of the mass spectrometer. Operation of the wide range ion source is controlled to select the correct ion source mode for the current pressure conditions.

An embodiment of a method for measuring process gas composition at high pressure levels and a residual gas at low pressure levels using a wide range ion source in a mass spectrometer system includes setting a mass spectrometer to a mode of operation under low pressure, heating a first filament to a predetermined emission current using a first filament current and measuring residual gas composition. The cleanliness of a vacuum system and the mass spectrometer system is checked and the first filament current is turned off. The mass spectrometer is then set to a mode of operation under high pressure conditions. a second filament is heated to a predetermined emission current using a second filament current and a process gas composition is measured. The cleanliness of the process gas is checked and the process is monitored for the existence of products created by the process.

In an embodiment, the wide range ion source has a conductance of 0.1 l/s only to establish a pressure drop by a factor of 1000 between the process chamber and the mass spectrometer volume. This pressure reduction is reached by using only small holes in the ion formation chamber of 2 times 0.5 mm for electron injection and one hole of 1 mm for ion extraction. Holes having a diameter of 0.5 mm limit the electron flux into the ion formation chamber dramatically. The other side the ion formation chamber has a large opening to the process for not creating an additional pressure drop. In front of this large opening an additional filament is mounted. Electrons from this filament can reach the ionization volume without any limitations and so nearly all electrons emitted from this filament will create ions in the desired volume.

An embodiment of a wide-range ion source for a mass spectrometer comprises a first portion including an anode and comprising a first filament positioned proximate the anode and secured in place relative to the anode. The first filament is exposed to a pressure of a process chamber and a first electron repeller has at least a partially circular shape. A second portion is positioned downstream of the first portion and includes a tubular anode, a second filament surrounding the tubular anode, an extraction lens defining an opening and a focus lens configured to conduct ions into a volume.

An embodiment of a method for measuring process gas composition and a residual gas using a wide range ion source in a mass spectrometer system comprises structuring a first portion of the wide range ion source to include an anode and a first filament positioned proximate the anode and secured in place relative to the anode and an electron repeller. The first filament is exposed to a pressure of a process chamber. The first filament is heated to a first predetermined emission current to measure a residual gas composition under low pressure conditions. A second portion of the wide range ion source is structured to be positioned downstream of the first portion and to include, a tubular anode, a second filament surrounding the tubular anode, an extraction lens defining an opening and a focus lens configured to conduct ions into a volume. The second filament is heated to a second predetermined emission current to measure a composition of a process gas under high pressure conditions. The products created by a process are then monitored.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

Figure 1A:
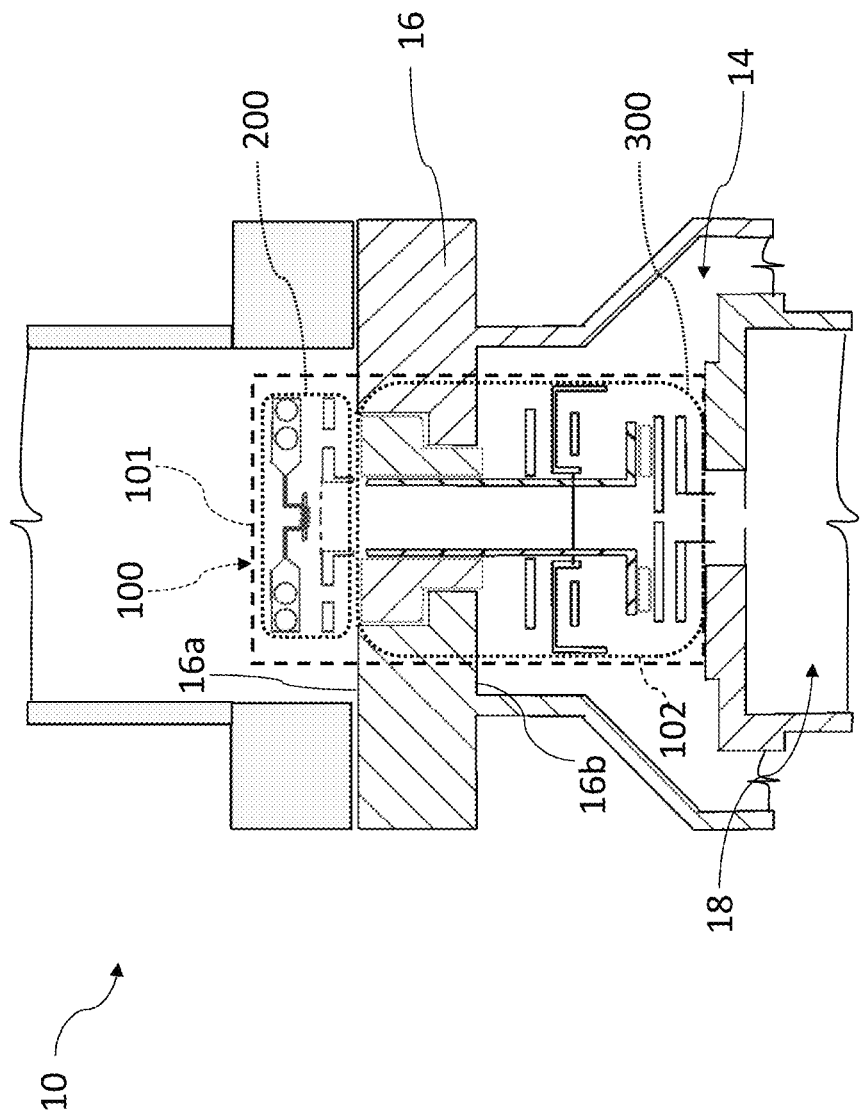
FIG. 1A schematically illustrates a cross sectional view of an embodiment of a wide range ion source positioned in a mass spectrometer.
Figure 1B:
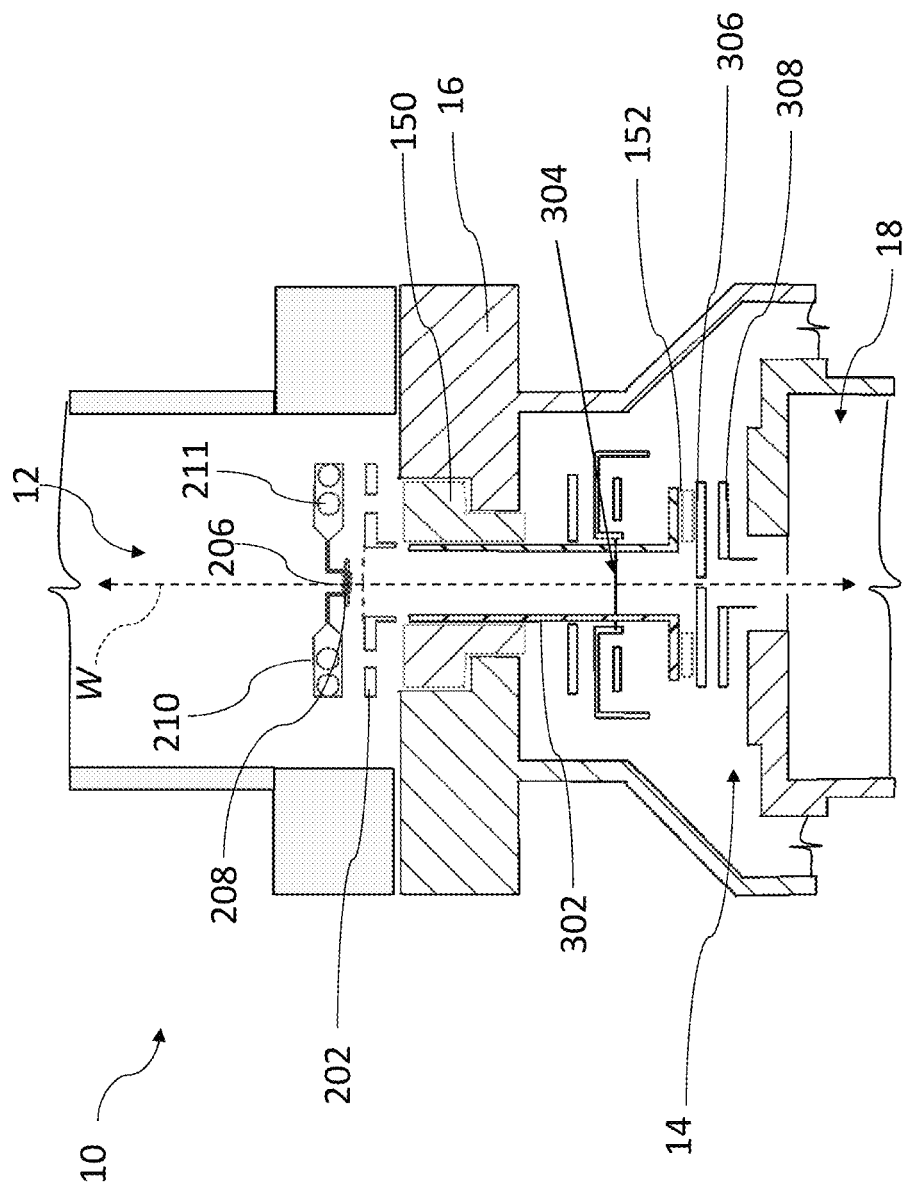
FIG. 1B schematically illustrates a cross sectional view of an embodiment of a wide range ion source positioned in a mass spectrometer.
Figure 2B:
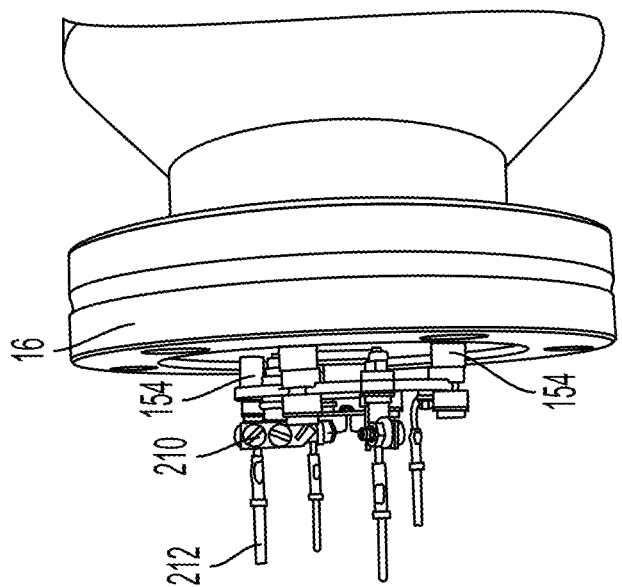
FIG. 2B illustrates a perspective side view of the embodiment of the wide range ion source from FIG. 2A.
Figure 2A:
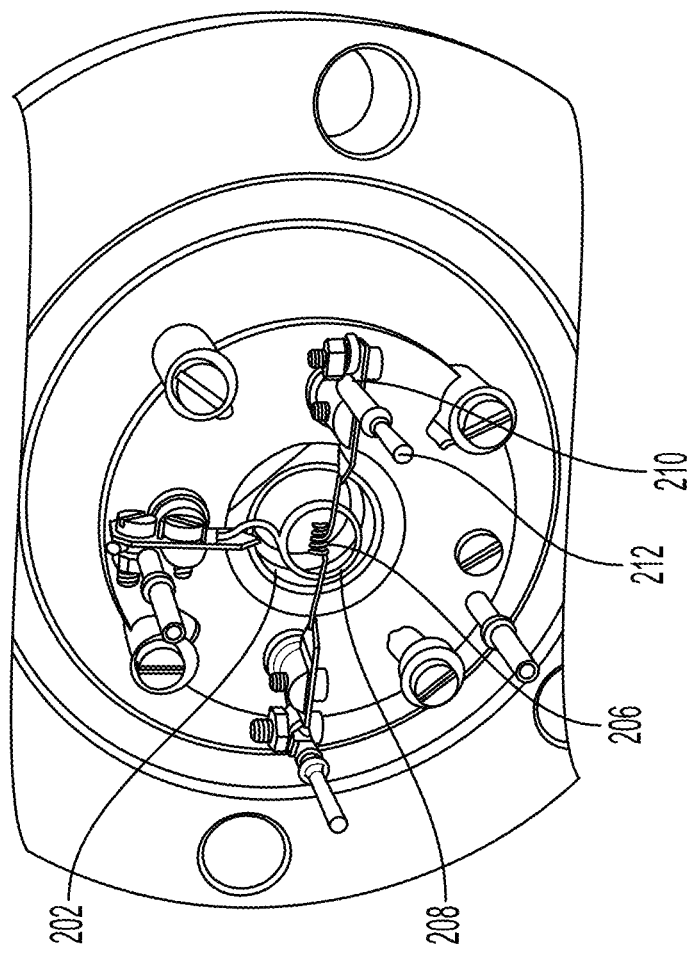
FIG. 2A illustrates a top perspective view of an embodiment of a wide range ion source.

The following discussion relates to various embodiments of a wide range electron impact ion source for a mass spectrometer. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the a wide range electron impact ion source for a mass spectrometer and are not specifically provided to scale.

The disclosed wide range ion source combines the advantages of open and closed ion sources by having one or more filaments directly exposed to the process pressure and one or more filaments positioned in a differentially pumped vacuum housing. Turning to FIGS. 1A-3C, a schematic illustration of a cross-section of a portion of a mass spectrometer 10 is depicted with a wide-range ion source 100 having a first end 102 and a second end 102. As shown, the wide-range ion source 100 generally comprises a first portion 200 at the first end 101 and a second portion 300 at the second end 102.

Referring to FIGS. 1A-2B, the first portion 200 of the wide-range ion source 100 acts as an open axial ion source. The first portion 200 generally comprises an anode 202, which includes a filament 206 (or cathode) and a repeller 208. As shown, the anode 202 may at least partially comprise a grid defining a plurality of openings and the filament 206 may include a coiled Rhenium filament with the repeller 208. The filament 206 may be coupled to one or more securing members 210 that secure the filament 206 in place relative to the anode 202 and the repeller 208 such that the repeller 208 surrounds or mostly surrounds the filament 206. As shown, the anode 202 and repeller 208 may generally form a circular shape. The securing members 210 may be retained or coupled to one or more connector pins 212, which are coupled to a support, such as a ceramic insulator. In an embodiment, the securing members 210 may define one or more securing structures 211, such as holes or loops that enable the securing members 210 to be coupled to the connector pins 212. The filament 206 is positioned such that it is exposed to the pressure of the process chamber 12 (FIG. 1).

Figure 3C:
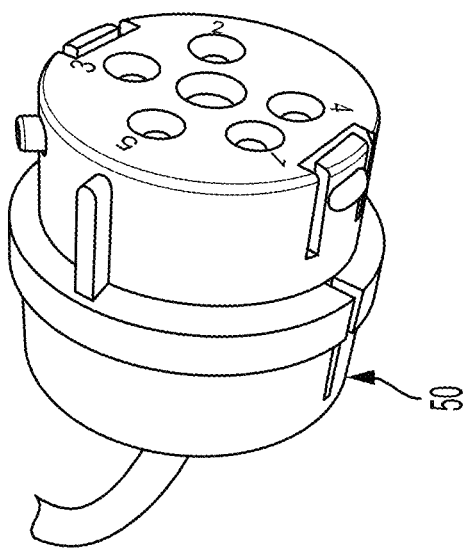
FIG. 3C illustrates the perspective view of an embodiment of an electrical connector configured to couple to the flange.
Figure 3B:
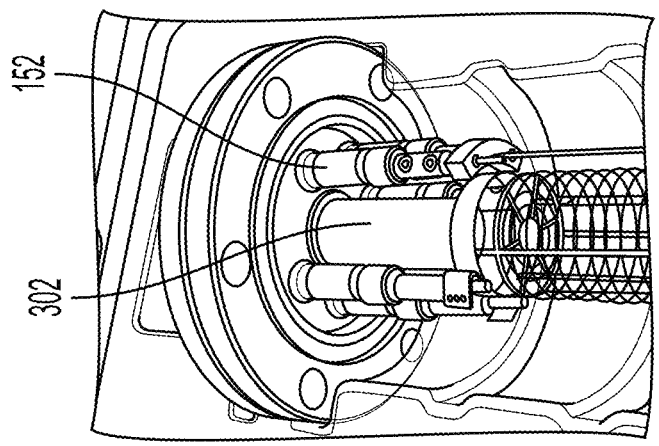
FIG. 3B illustrates a bottom perspective view of the flange of FIG. 3A.
Figure 3A:
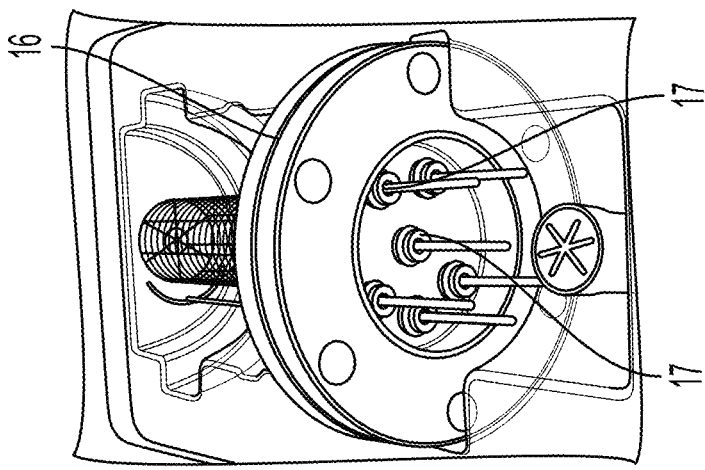
FIG. 3A illustrates a top perspective view of an embodiment of a flange configured to at least partially support the wide-range ion source.

Still referring to FIGS. 1A-2B, the second portion 300 of the wide-range ion source 100 includes a tubular anode 302 defining a plurality of electron entrance holes. The tubular anode 302 extends from a front side 16a of the flange 16 to a rear side 16b of the flange 16. In an embodiment, the electron entrance holes may be approximately 0.5 mm in diameter. A second filament 304 (cathode) is at least partially surrounds the tubular anode 302. As shown, the second filament 304 is positioned towards the second end 102 of the wide-range ion source 100. The second portion 300 further includes an extraction lens 306 defining a hole or aperture that is approximately 1 mm in diameter and a focus lens 308 for conducting ions into the volume or chamber of the quadrupole mass spectrometer 18. One or more of the components of the second portion 300 may be at least partially positioned within a differentially pumped chamber 14. As shown in FIG. 1B, the wide-range ion source 100 extends along the wide range ion source axis W such that at least part of the first portion 200 is positioned at the first end 101 and at least part of the second portion 300 is positioned at the second end 102. FIGS. 3A-C illustrate an example of a flange 16' that may be used for supporting an embodiment of the wide-range ion source 100. In this embodiment, the flange 16' defines one or more feedthrough openings 17 that can accommodate equipment for communication and/or control of components of the wide-range ion source 100 or other components positioned in the quadrupole mass spectrometer 18 or differentially pumped vacuum chamber 14. In an embodiment, the equipment may comprise wiring or tubing or any other means or communication and/or control. As shown, an electrical connector 50 may be used to establish an electrical connection with the first portion 200 of the wide-range ion source.

One or more ceramic insulators may be positioned adjacent to components of the first portion 200 and/or the second portion 300. As can be seen in FIGS. 1A-3C, a ceramic insulator 150 is positioned to create a seal between the tubular anode 302 of the second portion 300 and the flange 16 of the vacuum chamber 14. Another ceramic insulator 152 may be positioned to create a seal between the tubular anode 302 and the extraction lens 306. Ceramic insulators 154 may further be positioned to insulate other components of the first portion 200 from the flange 16 and/or other components of the wide-range ion source 100.

Figure 4A:
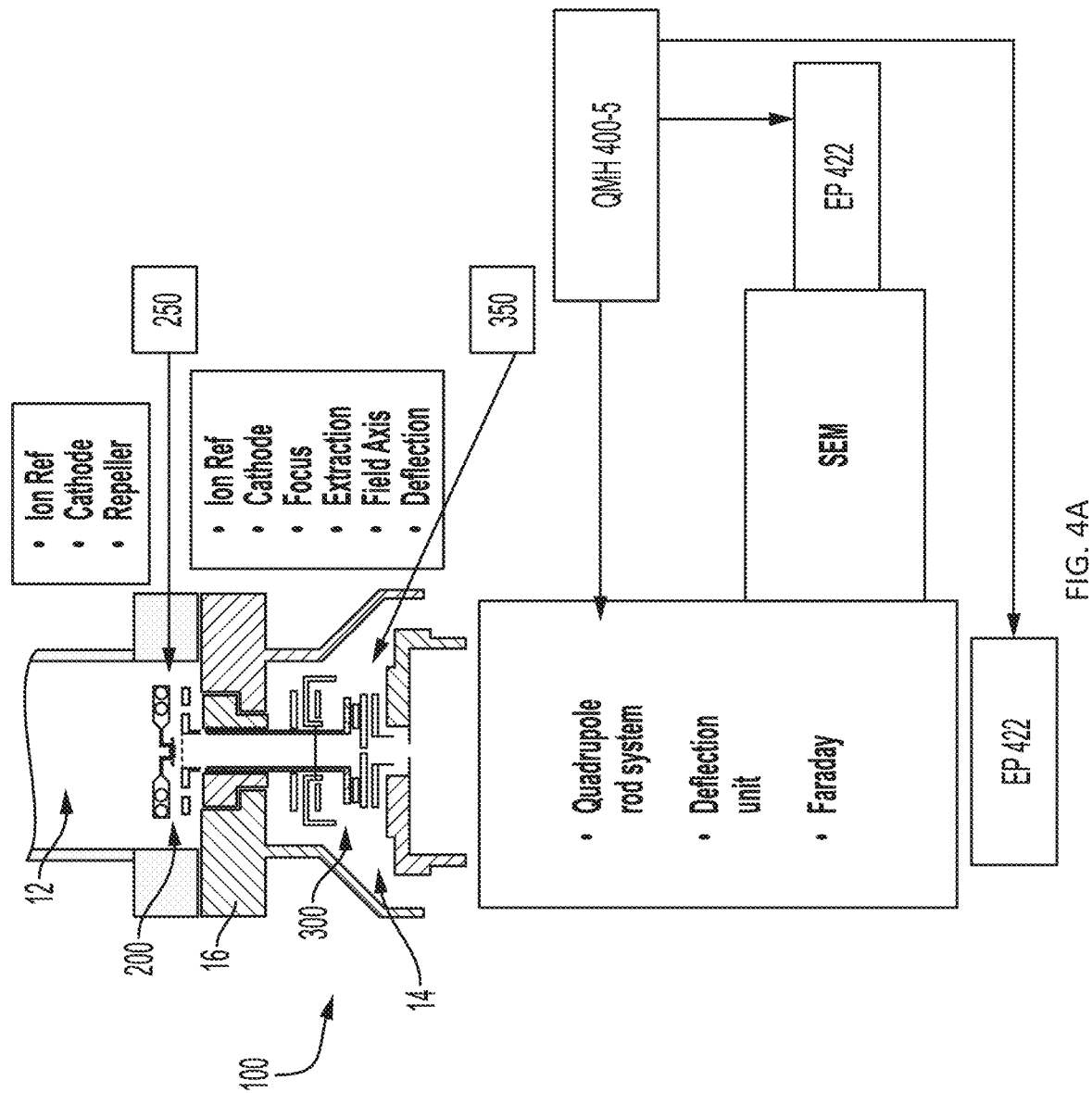
FIG. 4A schematically illustrates an embodiment of the wide-range ion source used in an embodiment of a mass spectrometry assembly.

In an embodiment shown in FIG. 4A, one or more of the components of the first portion 200 may be controlled using a first set of controllers and one or more components of the second portion 300 may be controlled by a separate second set of controllers. For example, the first set of controls may be similar or identical to those of a quadrupole mass spectrometer and used to operate components of the first portion 200 such as the filament 206, repeller 208 and the anode 202. Likewise, the second set of controls may be similar or identical to those of a quadrupole mass spectrometer and used to operate one or more components of the second portion 300 such as the filament 304, tubular anode 302, extraction lens 306 and focus lens 308. During operation of the filament 206 of the first portion 200, the parameters of the second portion 300 supply will need to be set to parameters that are different than their operating parameters. Similarly, when using the second portion 300 of the wide range ion source to conduct sample analysis, the parameters of the first portion 200 are set to parameters that are different than their operating/analysis parameters. These adjustments may be accomplished manually or by software commands using the first and second sets of controls. In an embodiment, the first and second sets of controls may enable preset settings to be stored for first portion 200 components and second portion 300 components so that such "non-operating parameters" of the first portion 200 and the second portion 300 may be preprogrammed and stored by the first and second sets of controls.

Figure 4B:
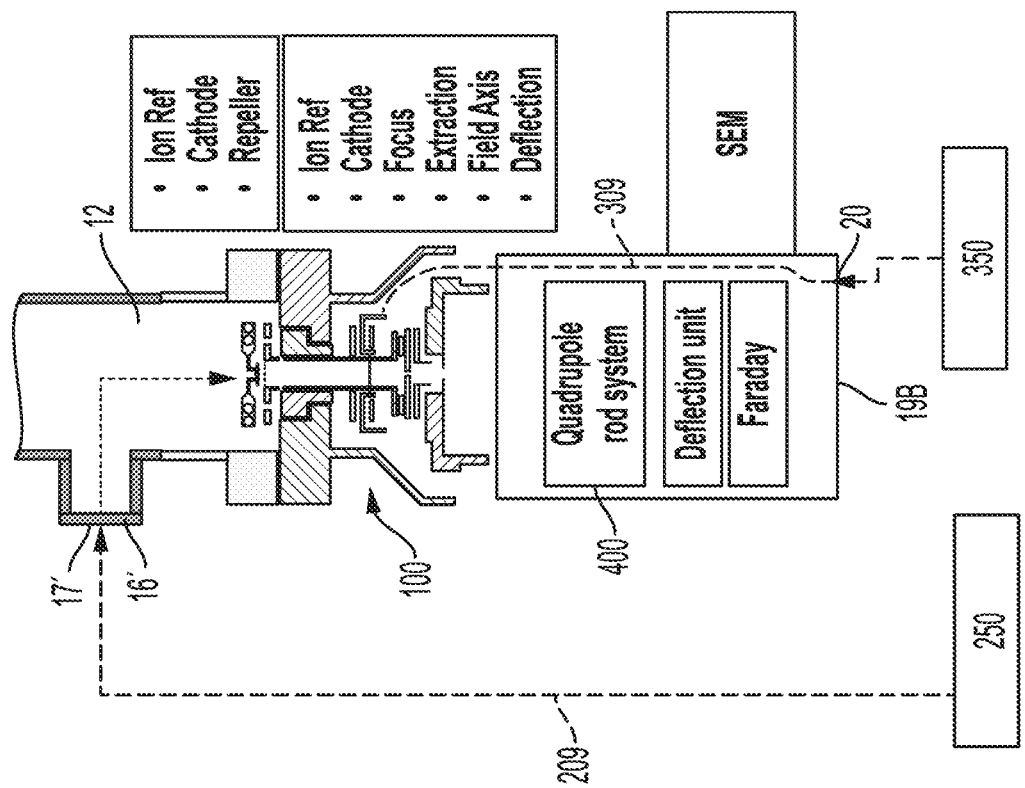
FIG. 4B schematically illustrates an embodiment of the wide-range ion source used in a mass spectrometry assembly.

Another embodiment of a quadrupole mass spectrometer that includes the wide-range ion source 100 is shown in FIG. 4B. In this embodiment another flange 16' is positioned within the process chamber 12 that may be similar to the flange 16 shown in FIG. 3A. The flange 16' comprises one or more feedthroughs 17' so that connections (atmospheric wiring) 209 for the first portion 200 may be fed out of the process chamber 12 and to an ion source supply 250. Connections (atmospheric wiring) 309 to supply the second portion 300 may pass to another ion source supply 350 via one or more feedthroughs 20 defined in a quadrupole base flange 19B. The vacuum wiring is positioned along the quadrupole rod system 400 (schematically illustrated) to the ion supply 300.

Figure 4C:
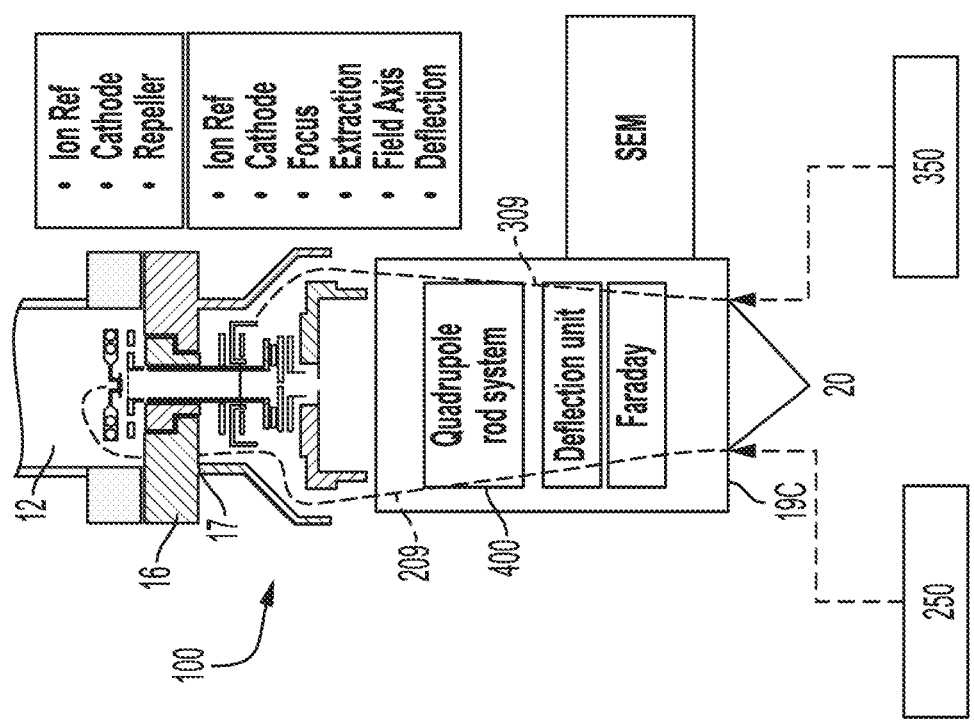
FIG. 4C schematically illustrates an embodiment of the wide-range ion source used in a mass spectrometry assembly.

Still another embodiment of a quadrupole mass spectrometer including a wide-range ion source 100 is shown in FIG. 4C. In this embodiment, the flange 16 comprises one or more feedthroughs 17 such as that shown in FIG. 3A. The connections 209 for the first portion 200 may be passed through the one or more feedthroughs 17 of the flange 16 and to the ion source supply 250 supply. The connections 309 for the second portion 300 does not need to be passed through the flange 16 and connects the second portion 300 to another ion source supply 350. In this embodiment, both connections 209, 309 to the ion source supplies 250, 350 may pass through the quadrupole base flange 19C. The connections 209, 309 may be vacuum wiring and/or any other wiring necessary to operate the wide-range ion source 100. In other embodiments, the connections 209, 309 may be run or installed differently to accommodate the geometry of the different devices on which the wide-range ion source 100 is installed and/or the configuration of the space in which the device is located.

Figure 5A:
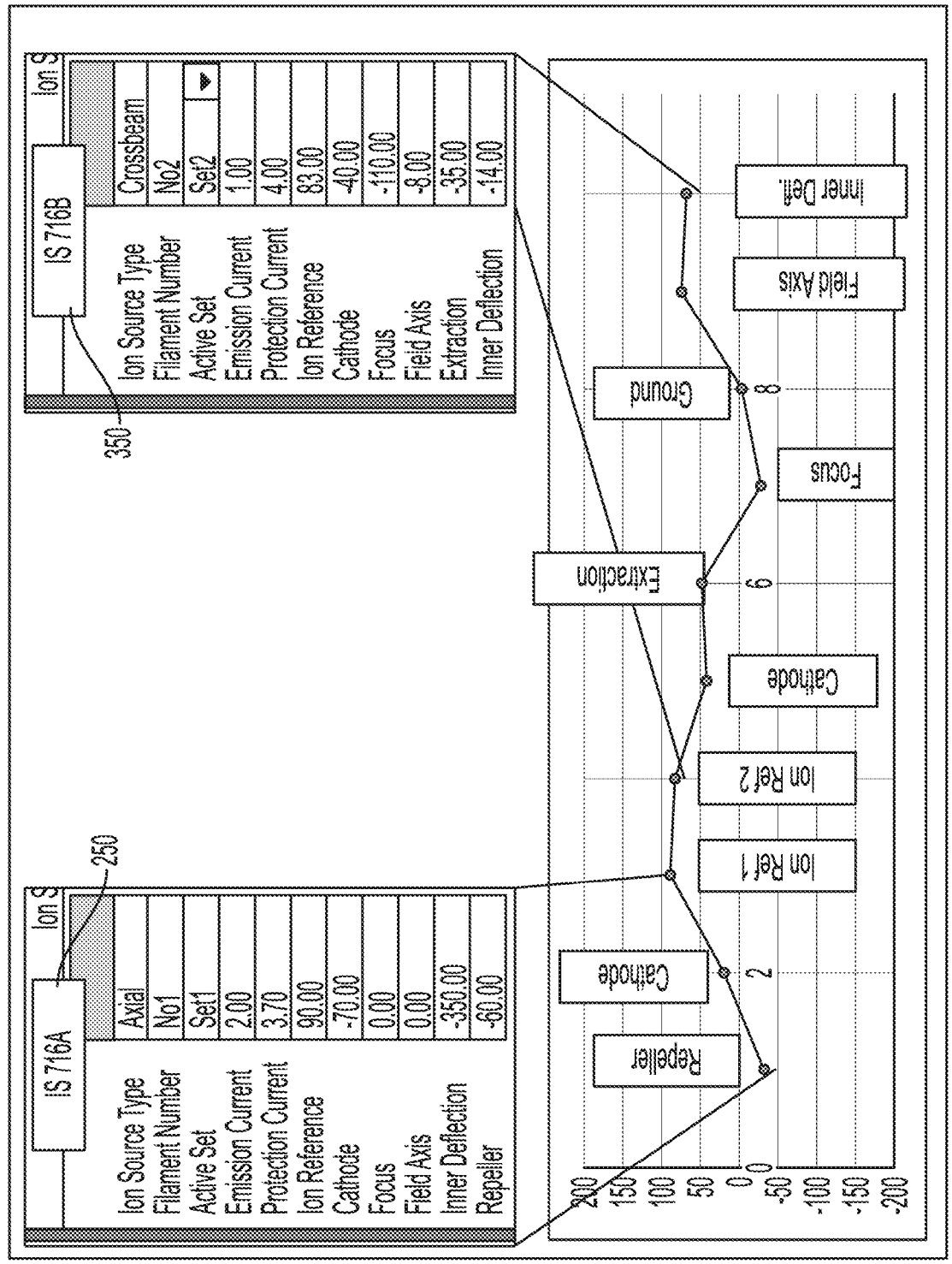
FIG. 5A illustrates an example of potentials created in the wide-range ion source by first and second ion source supplies when operating in a low pressure mode.

FIG. 5A illustrates an example of parameters of an embodiment of a mass spectrometer 10 equipped with the wide-range ion source 100 operating in a "low pressure" mode. In this embodiment, the mass spectrometer 10 has a first set of controls to control the components of the first portion 200 and a second set of controls to control the components of the second portion 300. In addition to separate control sets, the first portion 200 and the second portion 300 also may have separate ion source supplies 250, 350, respectively (FIG. 4). As shown, the filament (or cathode) 206 is at the cathode potential, which is heated by a current of up to 3.7 A (Protection Current) to release electrons. The electrons move to anode 202 at the first end 101 of the wide-range ions source 100. As shown, the anode 202 is at a potential "Ion Ref 1." The electron current from the filament 206 to the anode 202 is regulated to a predetermined value, in this case 2.0 mA (Emission Current). Positive ions resulting from collisions with the electrons are accelerated and focused to the mass spectrometer by the potentials set for ion source supply 350.

In order to check the gas composition at low pressure (start conditions) using two separate mass spectrometers, the mass spectrometer with the open ion source is started. The filament is heated using a current so that electrons are emitted from the filament towards the anode. The electron current is stabilized to a predetermined Emission Current. Measurements of the residual gas composition are taken and the cleanliness of the system is checked. In addition, a Helium leak test with improved detection limit may be performed. The mass spectrometer, and especially the filament current, is then shut down before introduction of any gas at a pressure above 1E-3 mbar. In order to check the gas composition at pressures higher than 1E-3 mbar, the mass spectrometer with the closed ion source is activated and the filament is heated with a filament current. The electron emission from the filament towards the anode is then checked and this current is stabilized to a pre-defined emission current. Measurements of the process gas composition are taken and the cleanliness of the process gas and the products created by the process are checked. The mass spectrometer, including the filament current, is shut down and the system is ready to switch to low pressure analysis again.

Figure 5B:
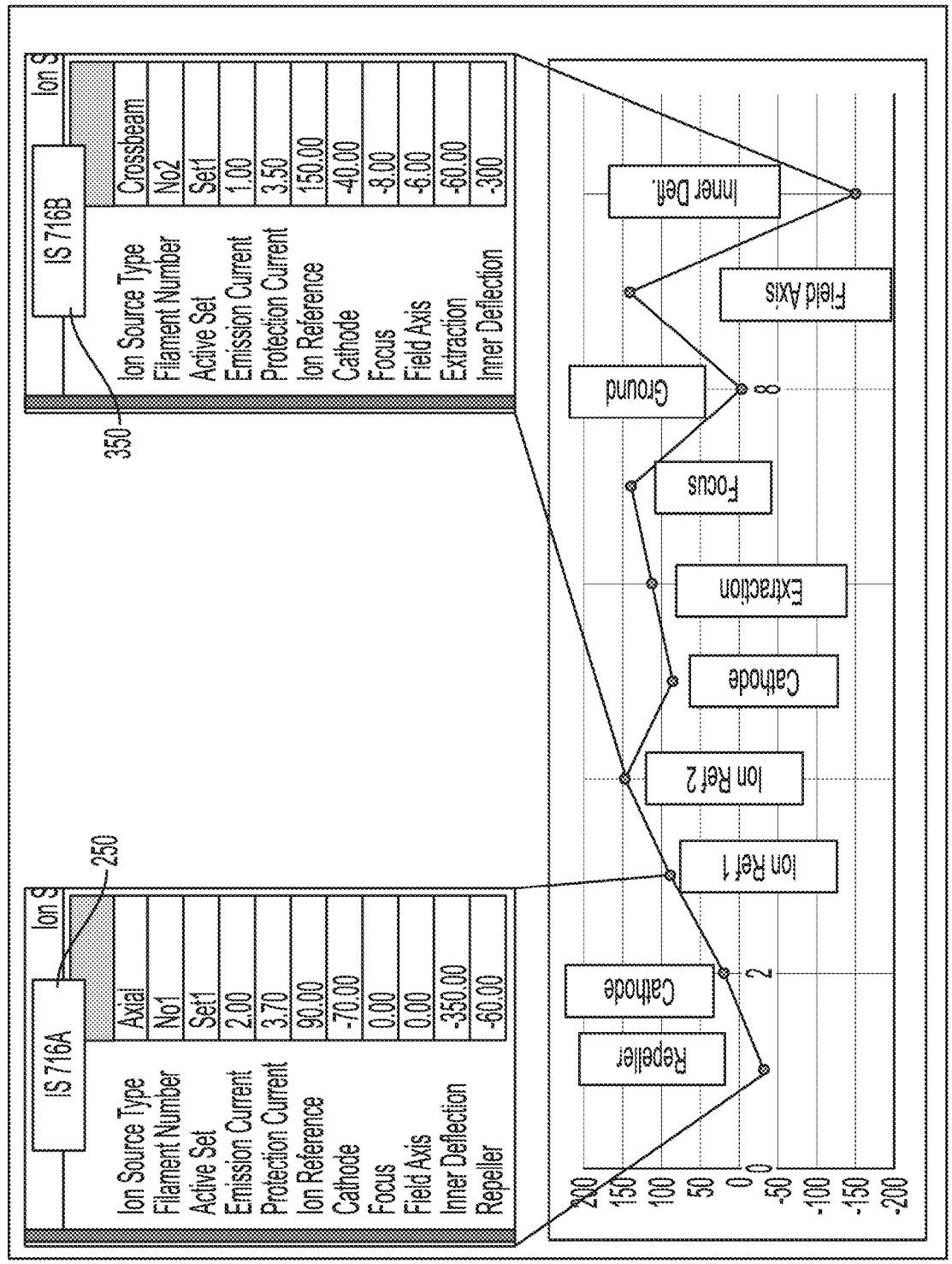
FIG. 5B illustrates an example of potentials created in the wide-range ion source by first and second ion source supplies when operating in a high pressure mode.

In a system with a single mass spectrometer, checking a gas composition at low pressure begins by starting the mass spectrometer under low pressure settings, for example those indicated in FIG. 5A. The filament is heated using a predetermined filament current, such as that indicated for the "IS 716A" of FIG. 5B. Electron emission from the filament to the anode is checked and stabilized to a predetermined emission current. Measurements of the residual gas composition are taken and the cleanliness of the system is checked. The mass spectrometer is shut off after measurements are completed. If the mass spectrometer, and especially the filament current, are operated when high pressure gas (above 1E-3 mbar) is introduced into the system, then the mass spectrometer may be damaged. For example, a filament of the mass spectrometer may be damaged such that the entire mass spectrometer must be shut down in order to replace the damaged filament. In order to check the gas composition at high pressures using a system with a single mass spectrometer, the mass spectrometer is started under high pressure settings (or a high pressure mode), such as those indicated in FIG. 5B for IS716B. The filament is heated using a predetermined filament current, such as that indicated for IS716B in FIG. 5B. The electron emission from the filament towards the anode is checked and stabilized to a predetermined emission current value. Measurements of the process gas composition are taken and the cleanliness of the process gas is checked. The system is also checked for products created by the process. The filament is turned off after measurements are complete and when it is desired to switch back to low pressure mode because the hot filament may influence the residual gas composition being measured in low pressure mode. Should the filament be left activated or in a heated condition, it will not be damaged by a switch to low pressure mode.

Figure 6:
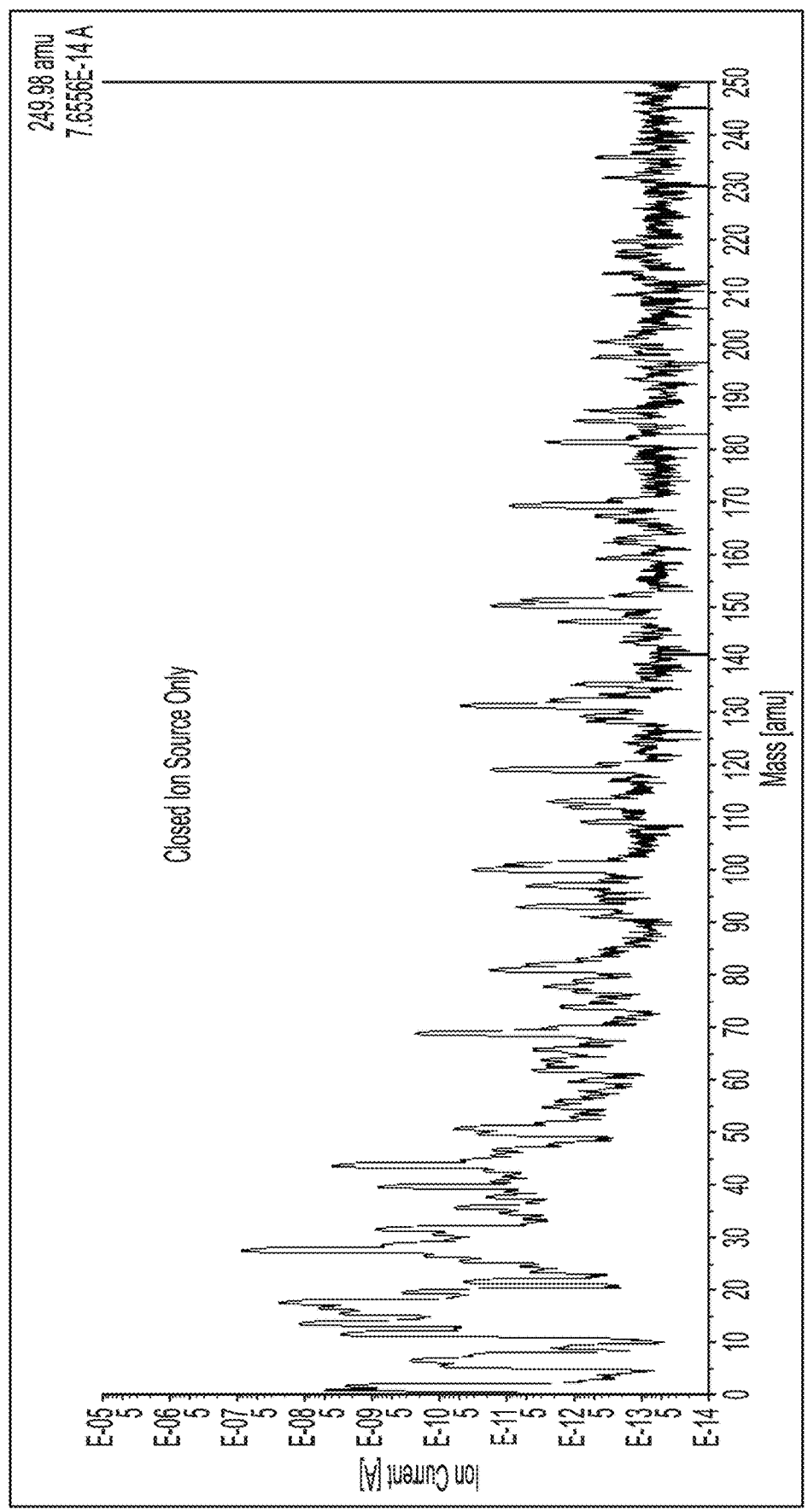
FIG. 6 illustrates an exemplary spectrum generated after analysis of a sample with only a closed ion source.
Figure 7:
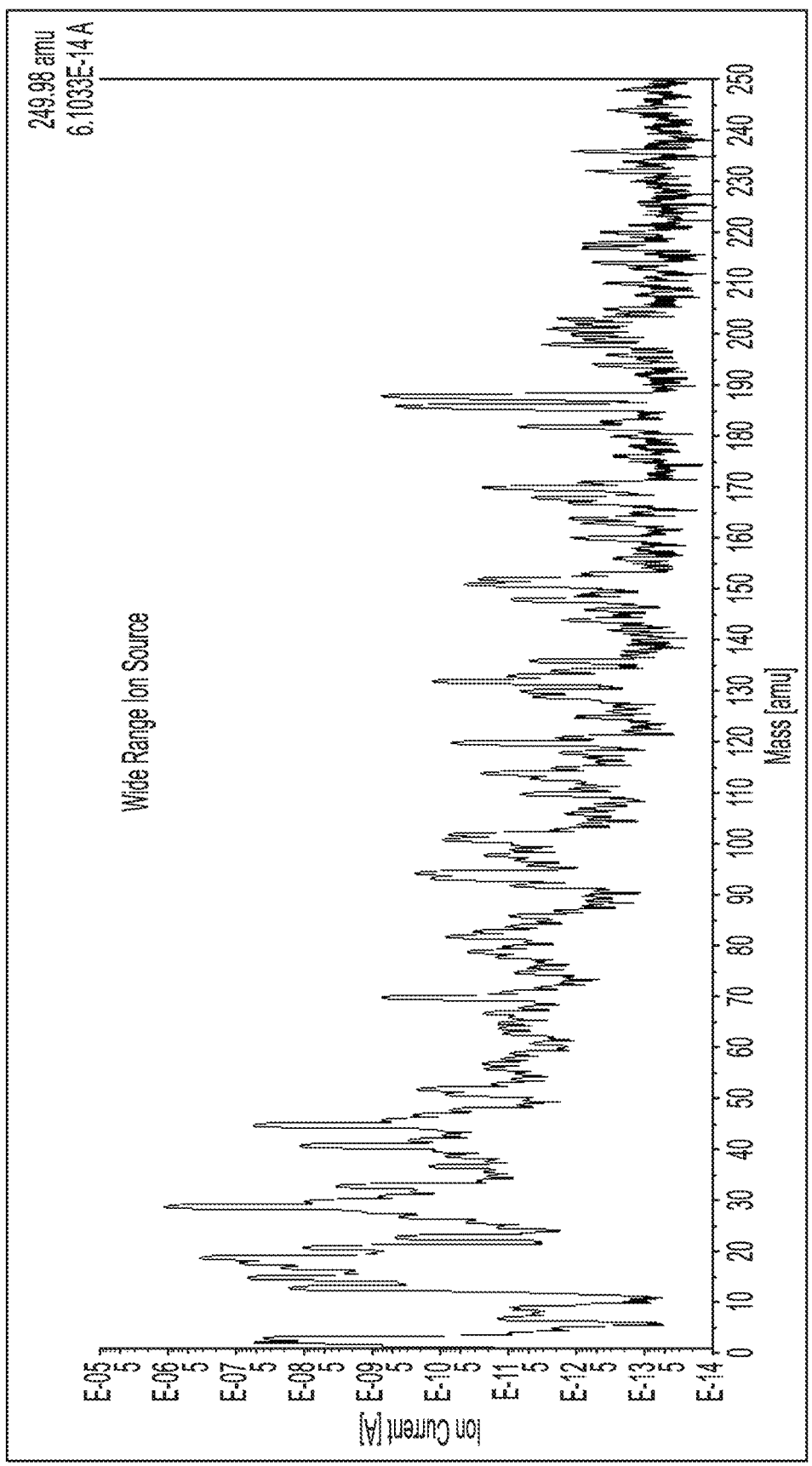
FIG. 7 illustrates an exemplary spectrum generated after analysis of essentially the same sample using the wide range ion source.

FIGS. 6 and 7 demonstrate the sensitivity of the disclosed wide-range ion source 100 as compared to a closed ion source. The two spectra shown in FIGS. 6 and 7 were taken at nearly identical gas compositions at a pressure of 5E-6 mbar in the analyzer chamber as well as in the process chamber. For both spectra of FIGS. 6 and 7, an SEM voltage of 1800V was used. Residual gas peaks result from not perfectly vacuum compatible components used for wiring the Axial part of the wide-range ion source 100 in the prototype setup. Intensities for the wide-range ion source 100 are about a factor of 20 higher than those for the closed ion source. For Faraday measurements, the following sensitivities were determined:

Sensitivity (closed ion source only)=2.2E-6 A/mbar
Sensitivity (wide range ion source)=4.0E-5 A/mbar The improved sensitivity of the wide range ion source results in a better detection limit at low pressures in the process chamber. The wide range spectrum shows additional peaks from Rhenium evaporated from the filament on mass numbers 185 and 187m/e. These peaks may be used for mass scale calibration in the high mass range.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A method for measuring process gas composition at high pressure levels and a residual gas at low pressure levels using a wide-range ion source in a mass spectrometer system, the method comprising:
    setting a mass spectrometer to a mode of operation under low pressure;
    heating a first filament to a predetermined emission current using a first filament current;
    measuring residual gas composition;
    checking cleanliness of a vacuum system and the mass spectrometer system;
    turning off the first filament current to the first filament;
    setting the mass spectrometer to a mode of operation under high pressure conditions;
    heating a second filament to a predetermined emission current using a second filament current;
    measuring process gas composition;
    checking cleanliness of the process gas; and
    monitoring existence of products created by the process.

2. The method of claim 1, further comprising:
    turning off the second filament current to the second filament; and
    changing the setting of the mass spectrometer back to the mode of operation under low pressure conditions.

3. The method of claim 1, wherein one of the first filament and the second filament is part of an open-ion source.

4. The method of claim 1, wherein the first filament current is the same as the second filament current.

5. A wide-range ion source for a mass spectrometer, the wide-range ion source comprising:
    a first portion including an anode and comprising,
        a first filament positioned proximate the anode and secured in place relative to the anode, wherein the first filament is exposed to a pressure of a process chamber,
        a first electron repeller comprising at least a partially circular shape; and
    a second portion positioned downstream of the first portion and including a tubular anode, the second portion comprising,
        a second filament surrounding the tubular anode,
        an extraction lens defining an opening, and
        a focus lens configured to conduct ions into a volume.

6. The wide-range ion source of claim 5, wherein the tubular anode defines a plurality of electron entrance openings.

7. The wide-range ion source of claim 5, wherein at least one of the first filament and the second filament comprises a coil.

8. The wide-range ion source of claim 7, wherein the coil comprises Rhenium.

9. The wide-range ion source of claim 5, further comprising at least one ceramic insulator configured to create a seal between the tubular anode and the extraction lens.

10. A method for measuring process gas composition and a residual gas using a wide-range ion source in a mass spectrometer system, the method comprising:
structuring a first portion of the wide-range ion source to include an anode and a first filament positioned proximate the anode and secured in place relative to the anode and an electron repeller, wherein the first filament is exposed to a pressure of a process chamber;
heating the first filament to a first predetermined emission current to measure a residual gas composition under low pressure conditions;
structuring a second portion of the wide-range ion source to be positioned downstream of the first portion and to include,
a tubular anode,
a second filament surrounding the tubular anode,
an extraction lens defining an opening, and
a focus lens configured to conduct ions into a volume;
heating the second filament to a second predetermined emission current to measure a composition of a process gas under high pressure conditions; and
monitoring existence of products created by a process.

11. The method of claim 10, further comprising:
checking a cleanliness of a vacuum system and the mass spectrometer system; and
checking a cleanliness of the process gas.

12. The method of claim 10, wherein one of the first filament and the second filament is part of an open-ion source.

13. The method of claim 10, further comprising structuring the tubular anode to define a plurality of electron entrance openings.

14. The method of claim 10, further including structuring at least one of the first filament and the second filament as a coil.

15. The method of claim 14, wherein the coil comprises Rhenium.

16. The method of claim 10, further comprising structuring at least one ceramic insulator to create a seal between the tubular anode and the extraction lens.

* * * * *